United States Patent [19]

McManis

[11] Patent Number: 5,629,984
[45] Date of Patent: May 13, 1997

[54] SYSTEM AND METHOD FOR DATA SECURITY

[75] Inventor: Charles E. McManis, Sunnyvale, Calif.

[73] Assignee: Sun Microsystems, Inc., Mountain View, Calif.

[21] Appl. No.: 402,485

[22] Filed: Mar. 10, 1995

[51] Int. Cl.⁶ .................. G09C 5/00; H04K 1/02
[52] U.S. Cl. .................. 380/54; 380/6; 380/7; 380/8; 380/9; 380/10
[58] Field of Search ............... 380/3, 4, 5, 6, 380/7, 8, 9, 10, 54, 59; 348/56

[56] References Cited

U.S. PATENT DOCUMENTS

| | | | |
|---|---|---|---|
| 4,424,529 | 1/1984 | Roese et al. | 348/56 |
| 4,967,268 | 10/1990 | Lipton et al. | 348/56 |
| 5,117,302 | 5/1992 | Lipton | 359/227 |
| 5,181,133 | 1/1993 | Lipton | 359/84 |
| 5,233,436 | 8/1993 | Oksman et al. | 380/54 X |
| 5,327,153 | 7/1994 | Biverot | 380/54 X |

*Primary Examiner*—Bernarr E. Gregory
*Attorney, Agent, or Firm*—Blakely Sokoloff Taylor & Zafman LLP

[57] ABSTRACT

A system and method for substantially reducing accidental disclosure of confidential information by interleaving video data frames with video flash frames. These video flash frames preclude an unauthorized person not wearing an appropriate shutter device from intelligibly reading video data frames by influencing the unauthorized person's eye prior to transmission of the video data frame.

20 Claims, 7 Drawing Sheets

SYSTEM AND METHOD FOR DATA SECURITY

BACKGROUND OF THE INVENTION

1. Field of the Invention

The present invention relates to a system and method for data security. More particularity, the present invention relates to a system alternatively displaying video "flash" frames and video data frames to prevent unauthorized users from reading confidential information being displayed on a display screen.

2. Background Art Related to the Invention

Throughout the past two decades, computer manufacturers have continued to create smaller, faster and more powerful desktop personal computers and portable computers, both of which have become a main ingredient of any successful business. Desktop personal computers typically use monitors having a cathode ray tube ("CRT") for displaying processed information. The CRT clearly displays such information so that persons generally facing the CRT may read the information. Thus, there can be a substantial risk of accidental disclosure of "confidential" information displayed on the CRT while an unauthorized person is present, particularly when the person is authorized to be in the area but is not authorized to have access to the confidential information that may be displayed from time to time.

Moreover, portable computers have become one of the fastest growing computer-related products because they can be used in a number of "mobile", unsecured locations where power is not available such as, for example, on commercial vehicles (e.g., airplanes, trains, buses, etc.), at customer job-sites and the like. In recent years, efforts have been made by portable computer manufacturers to provide flat panel display screens as readable as CRT screens through the use of active matrix technology. However, this enhanced screen readability also increases the risk of accidental disclosure of confidential information to unauthorized persons when portable computers are used in unsecured locations.

Currently, there are many approaches to protect confidential information displayed on a display screen of a portable computer or a desktop computer from being read by unauthorized persons. One approach is to "shield" the display screen when displaying confidential information by attaching mechanical fixtures to the monitor or placing objects (including one's body) between the display screen and the unauthorized person. However, this rudimentary approach has many disadvantages.

One disadvantage is that "shielding" does not completely eliminate the possibility of accidental disclosure of confidential information. Such "shielding" may preclude persons at an angle to the display screen from reading the confidential information displayed thereon, but offers no protection against persons standing or sitting directly behind the computer operator. In addition, shielding may slightly impair the computer operator's ability to clearly see the display screen and, as a result, may adversely affect his or her productivity.

Another disadvantage associated with the above-described shielding procedure is that it does not provide a secure environment to allow the computer operator to temporarily leave his or her computer unattended with the monitor powered-on. This is due to the fact that unauthorized persons may glance at the confidential information during the operator's absence. Requiring the computer operator to continually power-down his or her monitor is detrimental to the useful life of the monitor and improperly places the onerous burden of protecting confidential information directly on the operator. Moreover, it may be necessary for the operator to power-down the computer before leaving since an unauthorized user may quickly gain access to confidential information by simply powering-on the monitor and opening a file. Regardless, any power-down requirements waste valuable work time waiting for the display screen to be fully illuminated or the computer to re-boot.

Hence, it would be advantageous to create a system and method which greatly mitigates the risk of accidental disclosure of confidential information during operation of the computer without solely relying on its computer operator to protect the confidentiality of the information.

BRIEF SUMMARY OF THE INVENTION

The present invention relates to a system and method for substantially reducing accidental disclosure of confidential information by alternatively displaying video data frames with video flash flames. These video flash flames preclude an unauthorized person from intelligibly reading video data frames by influencing the unauthorized person's eye prior to transmission and display of the video data frame. The system comprises a monitor, a transmitter, a computer altered in accordance with the present invention, and a pair of LCD shutter glasses which controllably become opaque.

The present invention is a software driver and output port combination to alternatively display the video data and flash flames. Alternatively, the present invention may be a video display interface including at least first storage element, a second storage element, a select element, a counter element and a signal conversion element. The first storing element receives a data stream from a communication bus and stores the data as a video data frame. The second storage element is configured to store a predetermined video flash frame. Both of these frames are input into a select element which selectively outputs either the video data frame or the video flash frame.

The counter element is coupled to the select element to control which of the two types of frames are to be transmitted to the signal conversion element. Such determination is based on a chosen periodic transmission of video data frames. The signal conversion element modifies the frames into appropriate video streams which are displayed by the monitor.

BRIEF DESCRIPTION OF THE DRAWINGS

The features and advantages of the present invention will become apparent from the following detailed description of the present invention in which.

DETAILED DESCRIPTION OF THE INVENTION

The present invention relates to a system for data security and its associated method of operation directed to preventing unauthorized persons from obtaining information being displayed on a display monitor of a computer system. In the following description, numerous details are set forth such as certain components of the data security system in order to provide a thorough understanding of the present invention. It will be obvious, however, to one skilled in the art that these details are not required to practice the present invention. In other instances, well-known circuits, elements and the like are not set forth in detail in order to avoid unnecessarily obscuring the present invention.

In the detailed description, certain terms are frequently used to represent various signal characteristics described herein. One such term is a "frame" being a composition of video signals transmitted serially or in parallel. Another term is "series" which is defined as one or more frames being transferred sequentially.

Figures 1A, 1B:
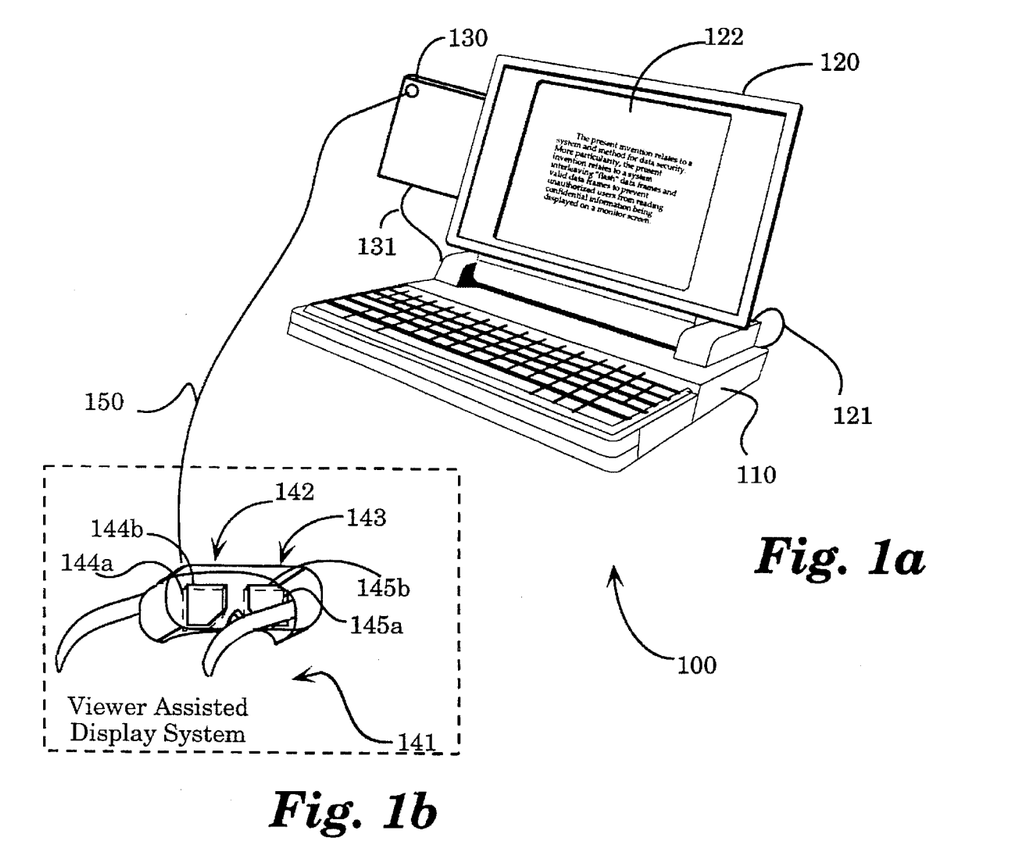
FIGS. 1a and 1b are perspective diagram illustrating the present invention operating in connection with a portable computer in which a transmitter generates a control signal to the LCD shutter glasses to control its opaqueness.

Referring to FIGS. 1a and 1b, an illustrative embodiment of a data security system 100 comprising a computer 110, a monitor 120, a transmitter 130 and a shutter device 140 including a pair of liquid crystal display ("LCD") shutter glasses 141 are shown. Preferably as shown, the present invention may be utilized for a portable computer having a flat panel display screen 122, but it may also be used for a wide range of other combinations. For example, the present invention may be used for desktop personal computers having a CRT screen. Moreover, the transmitter 130 used in association with the data security system may be a well-known transmitter activating and de-activating the shutter device 140 through an infrared link as described in U.S. Pat. No. 4,967,268, a particular control signal at a given radio frequency or an electrical control signal transmitted through at least one wire transmission line 150 as shown.

As shown, the computer 110 is coupled to both the monitor 120 through monitor signal lines 121 and the transmitter 130 through transmission lines 131. The computer 110 generates a video frame having display data (referred to as a "video data frame") and interweaves (i.e., intermittently transmits) the video data frame between a series of predetermined video frames (referred to as "video flash frames"). A video "flash" frame may be represented as a frame having an average intensity substantially greater than the video data frame (in which an overwhelming majority of pixels being illuminated). Thus, any person viewing the display screen 122 without the shutter device 140 sees a substantially illuminated, blank screen which precludes that person from intelligibly reading the valid data frame when displayed. Alternatively, it is contemplated that the series of video flash frames may be used to produce a specific pattern causing difficulty for a viewer without the shutter device to intelligibly read the video data frame is displayed.

In order for the computer operator to read the video data frame, he or she is required to wear the shutter device 140, for example the LCD shutter glasses 141 which are similar to those currently being manufactured by StereoGraphics Corporation of San Rafael, California and described in U.S. Pat. Nos. 4,967,268, 5,117,302 and 5,181,133 incorporated herewith by reference. The LCD shutter glasses 141 generally are oversized glasses that may fit over prescriptive glasses worn by the computer operator. Each lens 142 and 143 of the LCD shutter glasses 141 is constructed as an LCD device having liquid crystal material interposed between at least two sheets of transparent material 144a, 144b and 145a, 145b respectively. Upon the LCD shutter glasses 141 being "activated" (e.g., receiving power), liquid crystals (e.g., nematic crystals, etc.) are polarized causing them to become aligned so that the LCD lenses 142 and 143 are opaque. As a result, these opaque lenses 142 and 143 prevent saturation of the computer operator's optical nerve or visual distortion when viewing the video flash frame. If the LCD shutter glasses 141 are de-activated by the computer 110 (e.g., discontinues receiving power), the liquid crystals remain unaligned so that each lens 142 and 143 is transparent to enable the computer operator to view the video data frame.

De-activation of the LCD shutter glasses 141 may be accomplished by a number of methods. For example, the computer 110 may generate and transmit control information to the transmitter 130 via transmission lines 131 and, in response, the transmitter 130 controls its supply of power to the LCD shutter glasses 141 through the wire transmission line 150 as shown. Another alternative method is that the transmitter 130 transmits a control signal, being electrical, infrared or of a certain radio frequency in nature, to a receiver coupled to a controller (not shown) which receives power from a battery or from a wall socket. This controller appropriately controls the activation and de-activation of the LCD shutter glasses. There are numerous methods for performing this event, but the important aspect is that the de-activation of the LCD shutter glasses 141 is appropriately timed to be synchronous with the transmission and subsequent display of the video data frame so that the LCD shutter glasses 141 become transparent only when the video data frame is being displayed.

Figure 2:
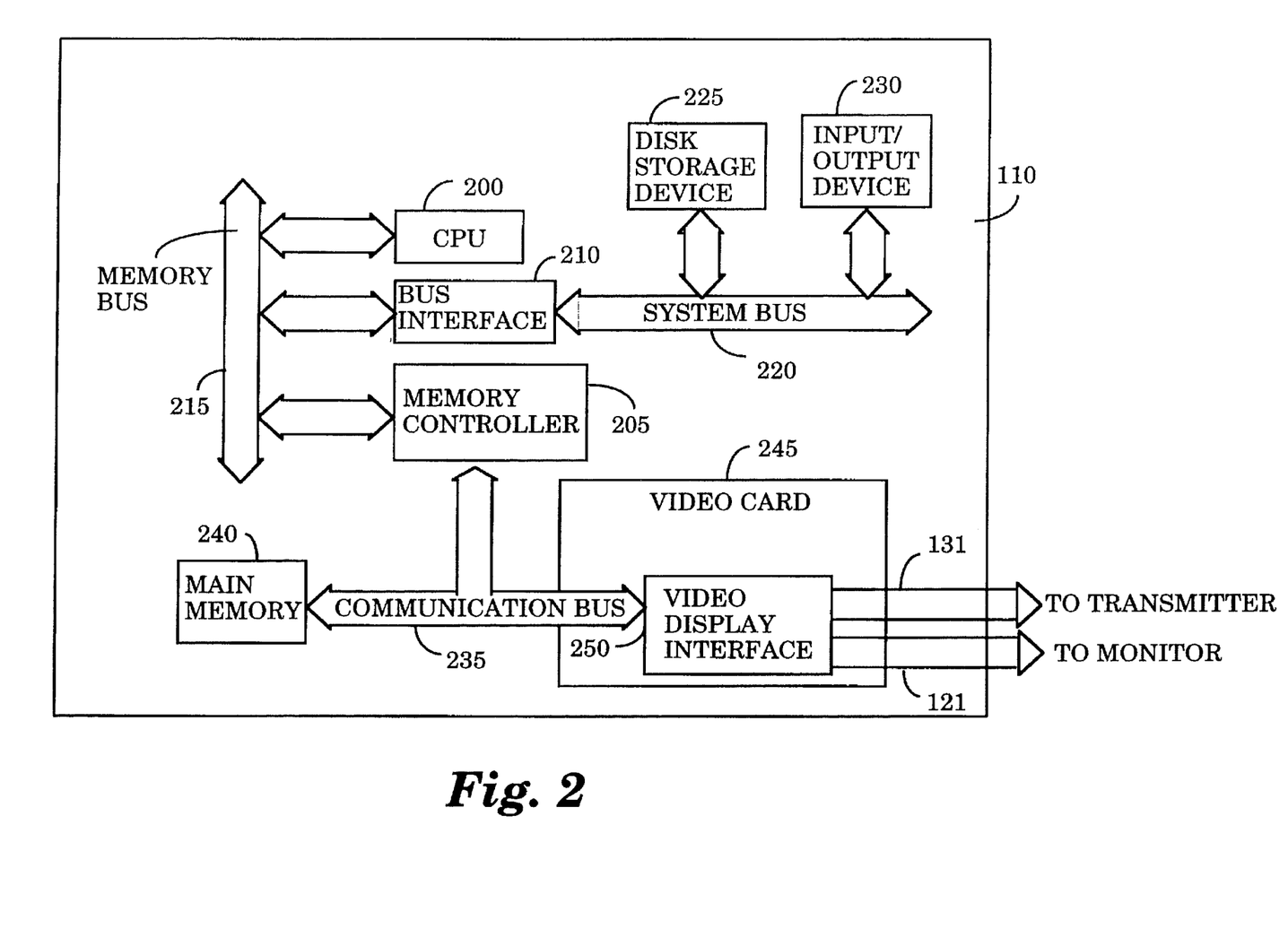
FIG. 2 is a block diagram of a first embodiment of a computer system employing the present invention as a video display interface employed within a video card.

Referring now to FIG. 2, an illustrative embodiment of the various circuits and systems that comprise the computer 110 are shown. The computer 110 comprises at least one central processor unit ("CPU") 200, a memory controller 205 and a bus interface 210, all of which are coupled to a memory bus 215. The bus interface 210 further is coupled to a system bus 220 which, in turn, is coupled to a disk storage device 225 and an input/output device 230. The memory controller 205 acts as an interface between the memory bus 215 and a communication bus 235 coupling main memory 240 to a video card 245.

During operation, the CPU 200 loads and executes program instruction sequences of a specific program loaded in main memory 240 or from software loaded in the disk storage device 225 and subsequently placed into main memory 240. Upon execution of the program instruction sequences, the CPU 200 generates write cycles requesting data to be written into the video card 245, more particularly a video display interface 250. The video display interface 250 receives the data and periodically transmits video data frames between a series of video flash frames through monitor signal lines 121. Furthermore, the video display interface 250 generates at least one control signal which is transmitted to the transmitter 130 via transmission lines 131 for later transmission to at least one pair of LCD shutter glasses. The transmission of the control signal is generally synchronous with the transmission of the video data frames.

Figure 3:
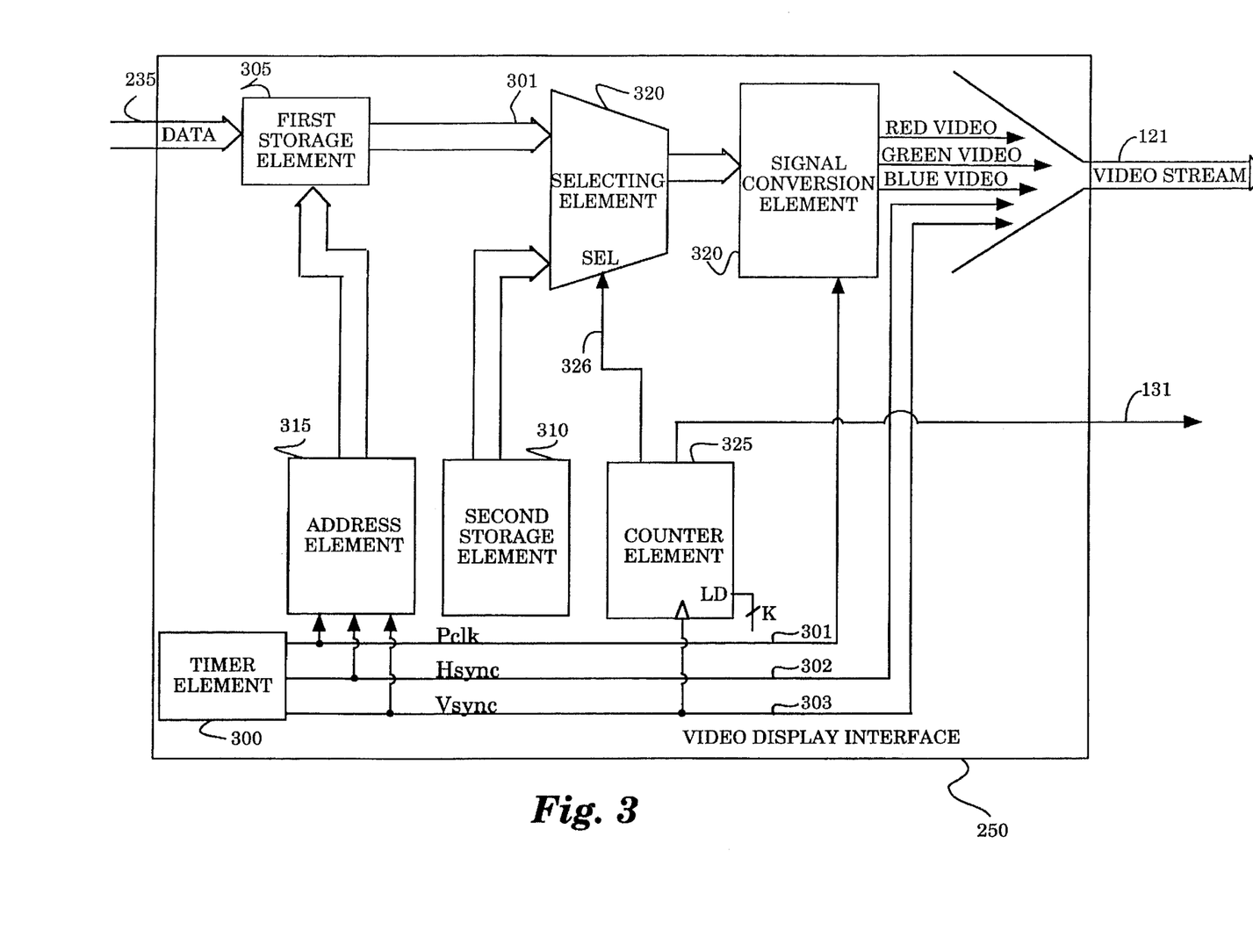
FIG. 3 is a block diagram of the components of the video display interface of FIG. 2.

Referring now to FIG. 3, an illustrative embodiment of the video display interface 250 according to FIG. 2 is shown. The video display interface 250 comprises a first storage element 305, a second storage element 310, an address element 315, a selecting element 320, a counter element 325 and a signal conversion element 330. The video display interface 250 may be clocked and controlled by an internal timer element 300. The timer element 300 generates a pixel clock ("$P_{clk}$"), a horizontal synchronous ("Hsync") pulse and a vertical synchronous ("Vsync") pulse through three dedicated signal lines 301–303.

The first storage element 305, being preferably random access memory ("RAM"), is coupled to the communication bus 235 to receive a stream of data from main memory thereby forming a video data frame being "n" bits in length ("n" being arbitrary). The $P_{clk}$ as well as the Hsync and Vsync pulses are input into the address element 315, being well-known in the art. These signals enable the address element 315 to select a video data frame temporarily stored in the first storage element 305. Thereafter, the selected video data frame is transmitted from the first storage element 305 into a first input of the selecting element 320 via a first bus line 306 (being "n" bits wide). In the event that multiple storage elements are employed in lieu of the first storage element 305, they may be coupled to the first input of the selecting element 320 by any well-known technique (e.g., multiplexing, software controlled, etc.).

The selecting element 320, being preferably a combination of multiplexers cascaded in series, is further coupled to the second storage element 310 through a second bus line 307 being n-bits wide. Being RAM or non-volatile memory such as EPROM, flash EPROM or EEPROM, the second storage element 310 stores a video flash frame which produces a bright, blank image on the display screen. An entire frame from either the first storage element 305 or the second storage element 310 is output from the selecting element 320 according to a particular logic value transmitted into a select input of the selecting element 320. It is contemplated that portions of the frame may be subsequentially transmitted and later combined.

As further shown in FIG. 3, the counter element 325 is coupled to a select "SEL" input of the selecting element 320 through a select control line 326. The counter element 325 is decremented for each Vsync pulse generated by the timer element 300. As a result, the counter element 325 typically asserts the select control line 326 to enable a series of video flash frames to be output from the selecting element 320. However, once the counter element 325 is decremented to a "zero" count value, the counter element 325 de-asserts the select control line 326 which selects a single video data frame from the first storage element 305 to be output through the selecting element 320.

Concurrently with the de-assertion of the select control line 326, the transmitter signal lines 131 are de-asserted, signaling the transmitter to provide sufficient latency to synchronize the de-activation of the LCD shutter glasses 141 with the display of the video data frame on the display screen. In addition, the counter element 325 is re-loaded with the count value (using arbitrary "k" signal lines) to begin counting. For example, if 5:1 interweaving is desired, the counter element 325 is set to numerical value of "5", allowing five video flash frames to be output from the selecting element 320 for each video data frame.

The selecting element 320 is coupled to the signal conversion element 330, preferably a RAM DAC chip set, a well-known integrated circuit which includes a RAM lookup table referenced by the pixel values in the image to output certain red, green, blue "RGB" digital display data stored at a certain address. The RGB display data is a translation of a particular segment of pixels of the frame being originally input therein into a collection of color display data signals representing RGB values for each particular pixel location of the frame from the select element 320. As each pixel is input into the signal conversion element 330, it generates three sets of voltage levels corresponding to the RGB display data. These voltage levels, along with the $H_{sync}$ and $V_{sync}$ pulses from the timer element 300, form a standard video stream which is transmitted through the monitor signal lines 121 and into the monitor for viewing video images resulting from the video data frames and the video flash frames.

Figure 4:
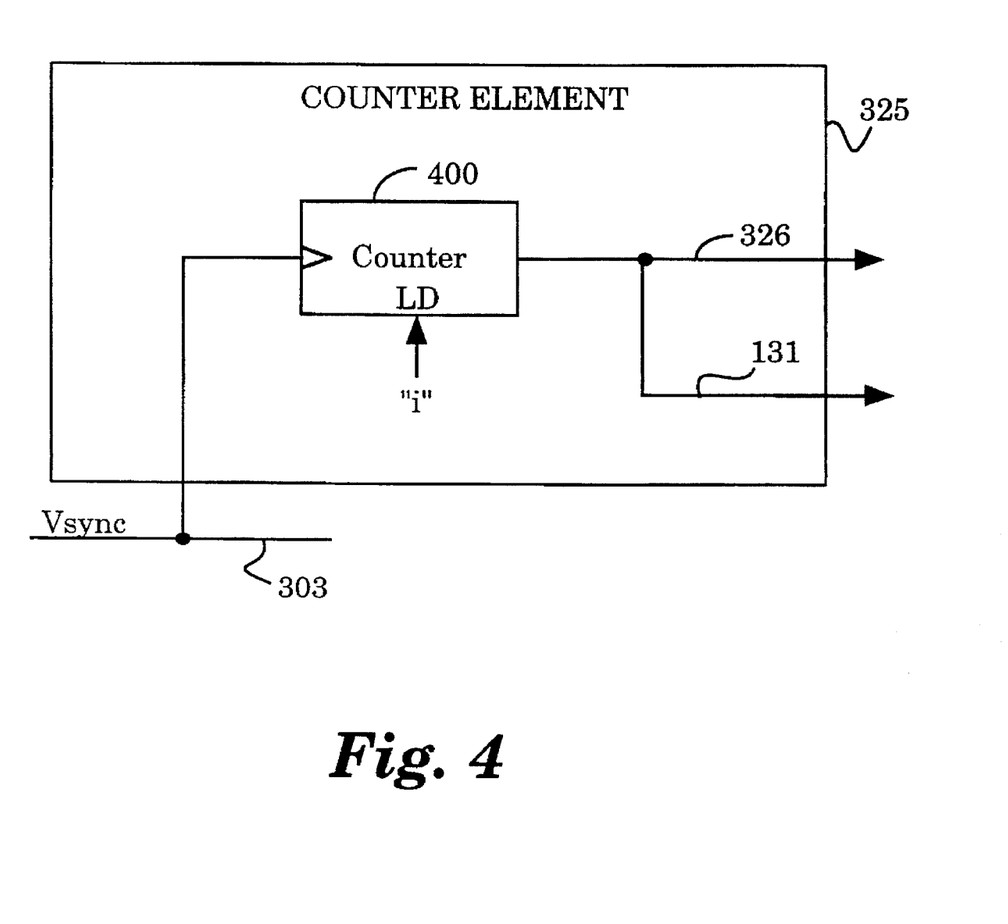
FIG. 4 is a block diagram of a first embodiment of the counter element capable of adjusting the pattern in interweaving video flash frames with a video data frame.

Referring to FIG. 4, an illustrative embodiment of the counter element 325 is shown. The counter element 325 includes a counter 400 appropriately loaded with a predetermined count value "i" ("i" being an arbitrary whole number). The counter 400 is clocked and decremented by the $V_{sync}$ pulse transmitted through the third designated line 303.

When the count value is decremented to "0", the counter 400 asserts its output terminal which is coupled to both the control select line 326 and the transmission lines 131. The control select line 326 allows either a video data frame or a video flash frame to propagate to the signal conversion element. If the video data frame is selected, it is synchronized with the de-activation of the LCD shutter glasses to allow its wearer to read the information displayed on the display screen. Otherwise, upon selecting propagation of the video flash frame, it is synchronized with the activation of the LCD shutter glasses.

Figure 5:
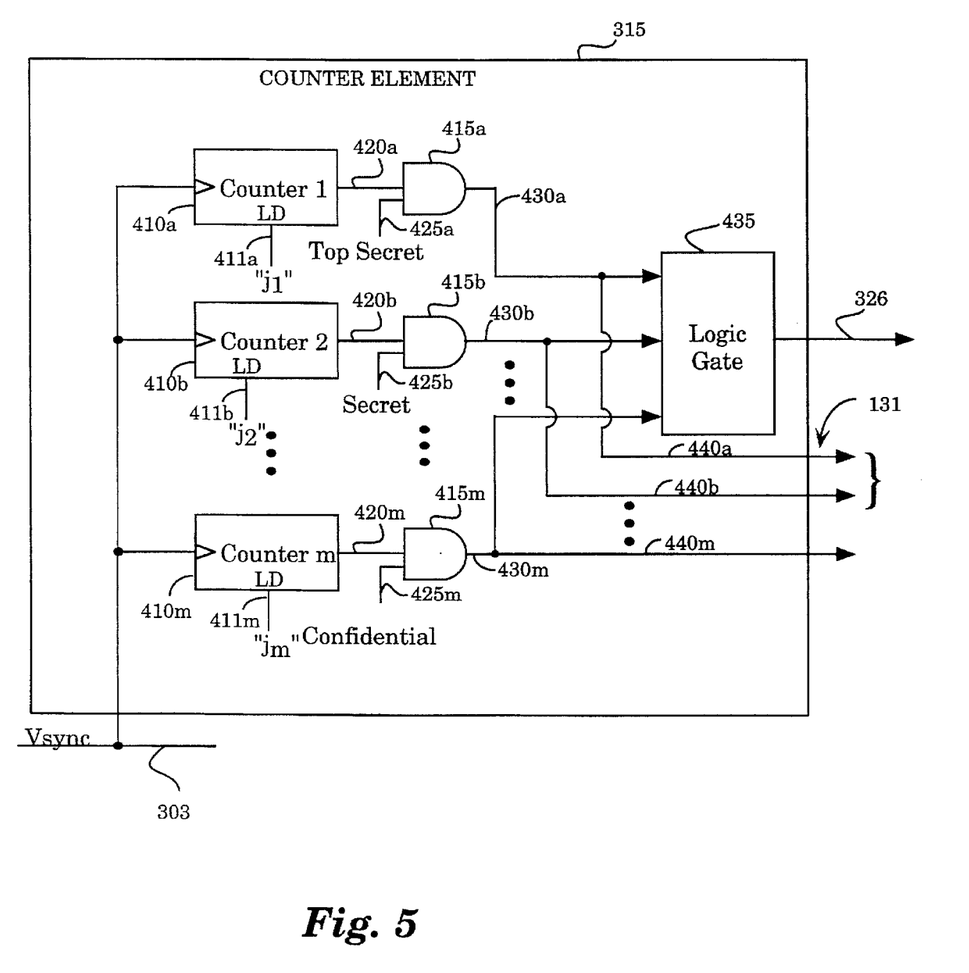
FIG. 5 is a block diagram of a second embodiment of the counter element capable of adjusting the series in interweaving video flash frames with a video data frame for priority purposes.

Referring to FIG. 5, a second embodiment of the counter element 325 for enabling persons having different clearance levels to view different video or text images displayed on the display screen is shown. The counter element 325 comprises a plurality of counters 410a–410m ("m" being arbitrarily large), where each counter 410a–410m is clocked by the $V_{sync}$ pulse transmitted through the dedicated $V_{sync}$ line 303. The counters 410a–410m are appropriately loaded through signal lines 411a–411m with different predetermined count values ( both "$j_1$","$j_2$" and the like, all being arbitrary whole numbers) which is decremented after every $V_{sync}$ pulse. These counters 410a–410m produce different interweaving combinations of the video flash and data frames which may be needed to establish different clearance levels as illustrated through an example discussed below.

The counters 410a–410m are coupled to a corresponding number of logic gates 415a–415m (e.g., AND gates) via output lines 420a–420m. In addition, a corresponding number of clearance lines 425a–425m also are coupled to the logic gates 415a–415m. If any of these clearance lines 425a–425m are inactive, its corresponding AND gate 415a–415m is prevented from asserting its output line 430a–430m upon fully decrementing the count value. This precludes any persons using the LCD shutter glasses from viewing data of that particular clearance level by leaving the LCD shutter glasses opaque. The logic gate 435, preferably an OR gate, awaits an asserted signal on any of the output lines 430a–430m to assert the control select line 326.

It is contemplated that the transmission lines 131 may include "m" control lines 440a–440m corresponding to the number of clearance levels supported by the counter element 315. Activation of one or more of these control lines 440a–440m signals causes de-activation of those LCD shutter glasses attached to the computer having clearance levels associated with those control lines 440a–440m.

Moreover, if data is to be viewed on more than one clearance level, the counter associated with each particular level of LCD shutter glasses shall be loaded with a count value that is a mathematical factor of the other LCD shutter glasses. For example, loading a first counter 410a with the count value of "2" and activating its appropriate clearance line 425a would enable LCD shutter glasses with a "Top Secret" clearance level to become transparent every other frame. In addition, by loading a second counter 410b with a count value of "4" and activating its appropriate clearance line 425b would enable its corresponding LCD shutter glasses with "Secret" to become transparent every fourth frame.

Since the first counter 410a is generating video flash frames for every other frame, those persons wearing LCD shutter glasses with "Secret" clearance will not be able to view data designated for the LCD shutter glasses with "Top Secret" clearance. However, since every fourth frame is also an "even" frame, the LCD shutter glasses with "Top Secret" clearance will be able to read data directed for both the LCD shutter glasses with both "Top Secret" and "Secret" clearances. This allows one to set up a system where higher levels of clearance can read the lower clearances as well. Alternatively, the counters 410a–410m could be loaded with count values that are not multiples of each other using prime numbers. This would prevent persons wearing LCD shutter glasses with "Top secret" clearance from seeing what those persons wearing LCD shutter glasses with "Secret" and/or "Confidential" clearance are seeing and possibly vice versa.

Figure 6:
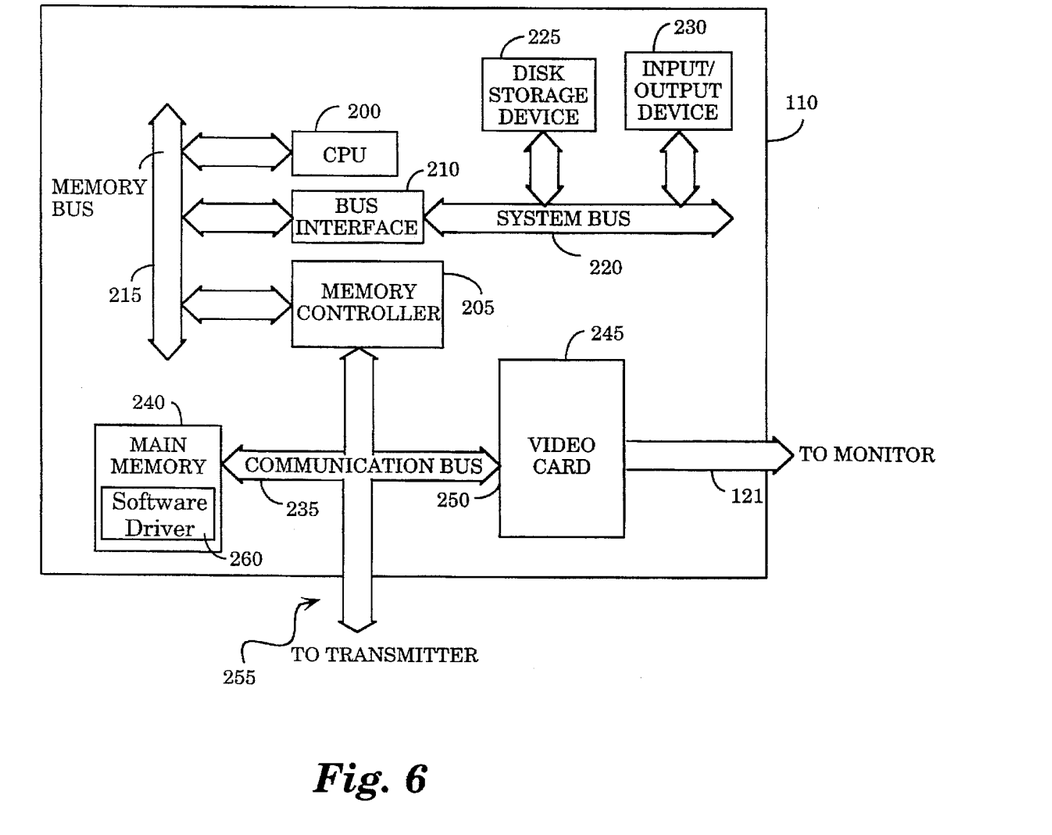
FIG. 6 is a block diagram of a second embodiment of the computer system employing the present invention as software stored in main memory or a disk storage device upon which transmitter control information is produced through an output port of the computer system.

Alternatively, the data security system may not be implemented as an integrated circuit or a collection of conventional components forming the video display interface 250 as discussed above. Rather, as shown in FIG. 6, a standard output port 255 is coupled between the communication bus 235 and the transmitter (not shown) to enable control information transmitted through the communication bus 235 to be driven through the output port 255 to control the LCD shutter glasses. A software driver 260, stored in main memory 240, may be used to control the inter alternate displaying of video flash and data frames based on a chosen interrupt scheme.

Figure 7:
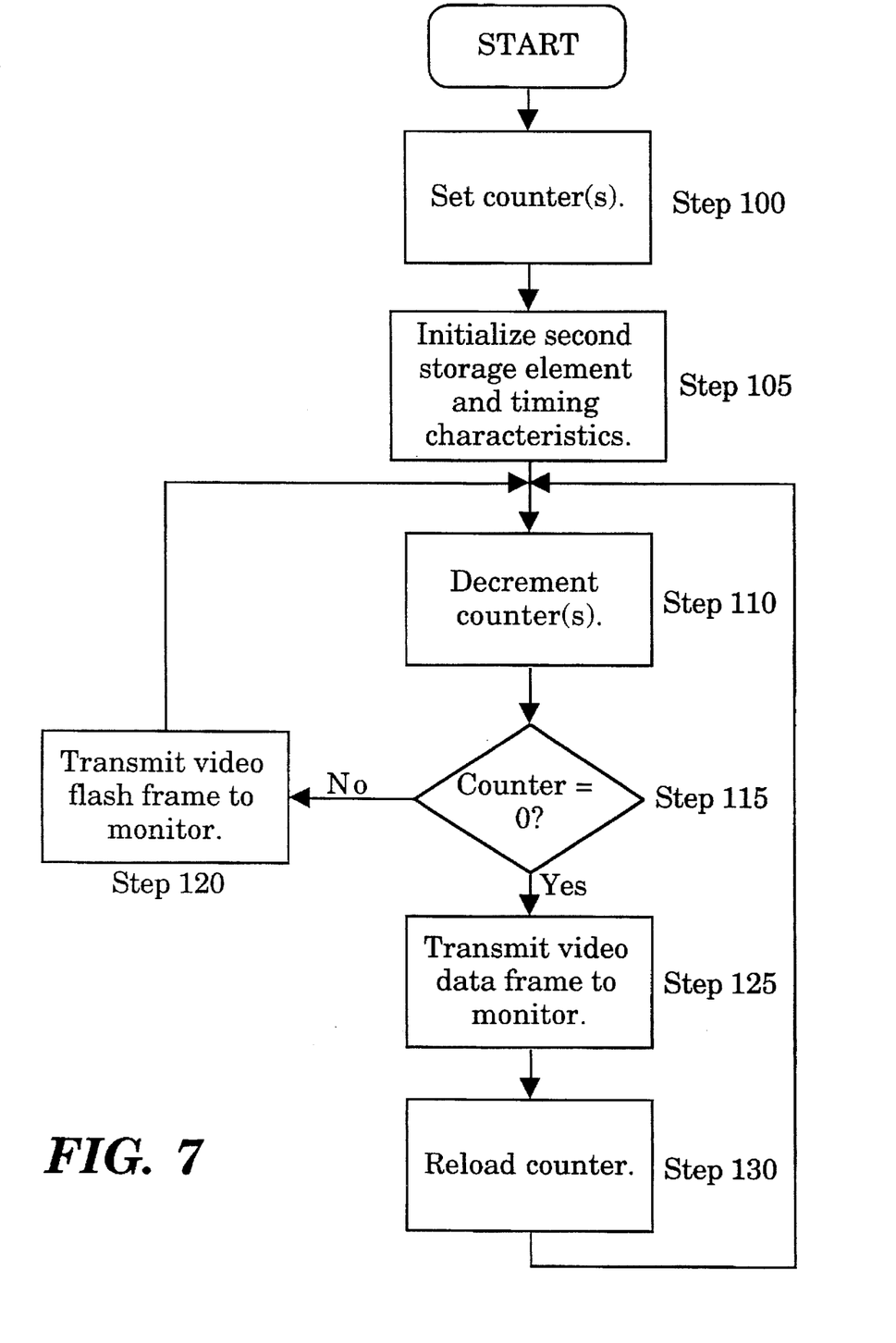
FIG. 7 is a flowchart presenting the operational steps of the present invention.

Referring to FIG. 7, a flowchart illustrating the procedural steps necessary to perform essential operations of the present invention is illustrated. First, each counter of the counter element is loaded with a particular count value (Step 100). This enables users having different clearance levels to be privy to different information in a common communication message. Next, in step 105, various initializations occur including setting the video flash frame to a certain intensity or test pattern stored in the second storage element, resetting necessary clocking, etc. In steps 110 and 115, the counter(s) associated with the counting element are decremented and each counter is monitored as to whether the count value is equal to "zero". If not, the monitor is set up to display a video flash frame (if appropriate) and the video flash frame is transmitted to the monitor (Step 120). Otherwise, if the counter is equal to "zero", a video data frame is transmitted to the monitor in lieu of the video flash frame (Step 125). The next operation is that counter is re-loaded with the particular count value (Step 130) and returns to Step 110 to continue operations for subsequently transmitted video frames.

The present invention described herein may be designed to use many different configurations and in accordance to many different operations. While the present invention has been described in terms of various embodiments, other embodiments may come to mind to those skilled in the art without departing from the spirit and scope of the present invention. The invention should, therefore, be measured in terms of the claims which follows.

What is claimed is:

1. An apparatus for preventing an unauthorized person from intelligibly viewing a video data frame, comprising:
   a select device that alternatively outputs the video data frame with a video flash frame being a video frame being a video frame having a majority of its pixels illuminated; and
   a display device coupled to said select device, said display device displays one of the video data frame and said video flash frame.

2. The apparatus according to claim 1 further comprising a shutter device coupled to and controlled by said select device, said shutter device is placed in a transparent state upon displaying the video data frame and is placed in an opaque state upon displaying said video flash frame.

3. The apparatus according to claim 2, wherein said select device comprises:
   a select element that receives the video data frame and said video flash frame and to selectively output one of the video data frame and said video flash frame;
   a counter element coupled to said select element through a select line, said counter element controls said select element; and
   a signal conversion element coupled to said select element, said signal conversion element converts said one of the video data frame and said video flash frame, output from said select element, into video signals used by said display device.

4. The apparatus according to claim 3 further comprising a first storage element coupled to said select element, said first storage element temporarily contains the video data frame prior to the video data frame being transferred into said select element.

5. The apparatus according to claim 4 further comprising a second storage element coupled to said select element, said second storage element temporarily contains said video flash frame prior to said video flash frame being transferred into said select element.

6. The apparatus according to claim 5 further comprising:
   a timer element that generates a pixel clock, a horizontal synchronous pulse and a vertical synchronous pulse through corresponding dedicated lines; and
   an address element coupled to said timer element via said corresponding dedicated lines, said address element selects, said address element is configured to select the video data frame temporarily stored in said first storage element.

7. The apparatus according to claim 6, wherein said counter element is loaded with a predetermined count value and is decremented by said vertical synchronous pulse.

8. The apparatus according to claim 7, wherein said counter element selects said video flash frame to be output from said select element by asserting said select line when said counter element is greater than zero and selects the video data frame to be output from said select element by de-asserting said select line when said counter element is equal to zero.

9. The apparatus according to claim 8, wherein said counter element includes a plurality of counters being loaded with different count values in order to provide different clearance levels.

10. The apparatus according to claim 2 further comprising a transmitter coupled to said select device through a transmission line, said transmitter indicates that the video data frame is being transmitted for display on said display device.

11. The apparatus according to claim 10, wherein said select element asserts said transmission line to indicate that the video data frame is being transmitted for display on said display device, causing said transmitter to transmit a control signal to said shutter device to appropriately de-activate said shutter device, said control signal being in synchronism with the video data frame.

12. A system for preventing an unauthorized person from intelligibly viewing a video data frame displayed on a display device, comprising;

a shutter device;

a transmitter coupled to said shutter device, said transmitter activates said shutter device to become opaque when the display device is displaying a video flash frame being a video frame having a majority of its pixels illuminated and to become transparent when the display device is displaying said video data frame; and a data processing system coupled to the display device and said transmitter, including:

a memory bus, a central processing unit coupled to said memory bus, said central processing unit processes said video data frame, a communication bus, a main memory element coupled to said communication bus, said main memory element contains said video data frame, a memory controller coupled to said memory bus and said communication bus, said memory controller enables said video data frame to propagate from said central processing unit to said main memory element, and a video display interface coupled to said communication bus, said transmitter and the display device, said video display interface alternatively displays said video data frame and said video flash frame and to output control signals to said transmitter in order to place said shutter device in a transparent state upon displaying said video data frame via the display device and to place said shutter device in an opaque state upon displaying said video flash frame via the display device.

13. The system according to claim 12, wherein said video display interface comprises:

a first storage element that contains said video data frame;

a second storage element that contains said video flash frame;

a select element coupled to said first and second storage elements, said select element receives said video data frame and said video flash frame and selectively outputs one of said video data frame and said video flash frame;

a counter element coupled to said select element through a select line and said transmitter through a transmission line, said counter element controls said select element and indicates when said video data frame is being transmitted to said display device; and a signal conversion element coupled to said select element, said conversion element converts said one of said video data frame and said video flash frame, output from said select element, into video signals used by the display device.

14. The system according to claim 13, wherein said video display interface further comprises:

a timer element generating a pixel clock, a horizontal synchronous pulse and a vertical synchronous pulse through corresponding dedicated lines; and an address element, coupled to said timer element via said dedicated lines, selecting said video data frame temporarily stored in said first storage element.

15. The system according to claim 14, wherein said counter element is loaded with a predetermined count value and is decremented by said vertical synchronous pulse.

16. The system according to claim 15, wherein said counter element selects said video flash frame to be output from said select element by asserting said select line when said counter element is greater than zero and selects said video data frame to be output from said select element by de-asserting said select line when said counter element is equal to zero.

17. The system according to claim 16, wherein said counter element includes a plurality of counters being loaded with different count values in order to provide different clearance levels.

18. The system according to claim 12, wherein said video display interface comprises:

an output port coupled between said communication bus and said transmitter, said output port propagates said control signals from said communication bus into said transmitter; and a software driver stored in said main memory element, said software driver controls the alternative display of video flash frames and video data frames based on an interrupt scheme.

19. A method for preventing an unauthorized person from intelligibly viewing a video data frame and for enabling an authorized person wearing a shutter device to intelligibly view the video data frame, comprising the steps of:

a) displaying a video data frame alternatively with at least one video flash frame being a video frame having a majority of its pixels illuminated; and b) controlling the shutter device in synchronism with step a) in order to place the shutter device in a transparent state upon displaying the video data frame and placing the shutter device in an opaque state upon displaying said at least one video flash frame.

20. The method according to claim 19, wherein said controlling step includes the steps of:

b1) determining a clearance level associated with said video data frame; and b2) transmitting a control signal to the shutter device to place the shutter device into said transparent state, provided the shutter device associated with the authorized person is able to support video data frames of said clearance level.

* * * * *